Sept. 20, 1955　　F. M. ALEXANDER ET AL　　2,718,400
RECORD-HANDLING DEVICES

Filed April 23, 1948　　6 Sheets-Sheet 1

INVENTORS
Frederick M. Alexander
Harry C. Jones, Jr.
BY
ATTORNEYS.

Sept. 20, 1955  F. M. ALEXANDER ET AL  2,718,400
RECORD-HANDLING DEVICES
Filed April 23, 1948  6 Sheets-Sheet 2

INVENTORS
Frederick M. Alexander
Harry C. Jones, Jr.
BY
ATTORNEYS.

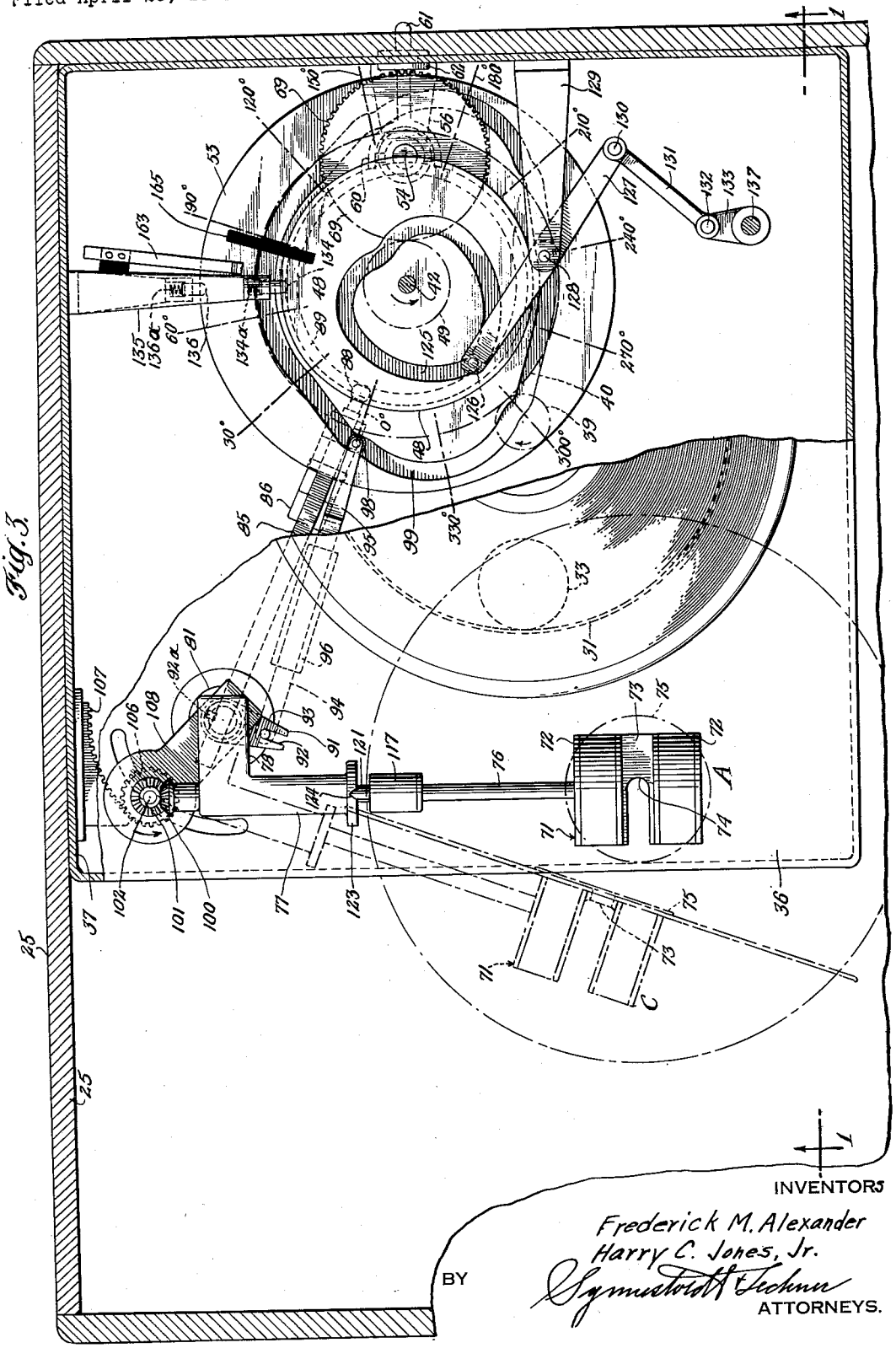

Sept. 20, 1955　　F. M. ALEXANDER ET AL　　2,718,400
RECORD-HANDLING DEVICES
Filed April 23, 1948　　6 Sheets-Sheet 4
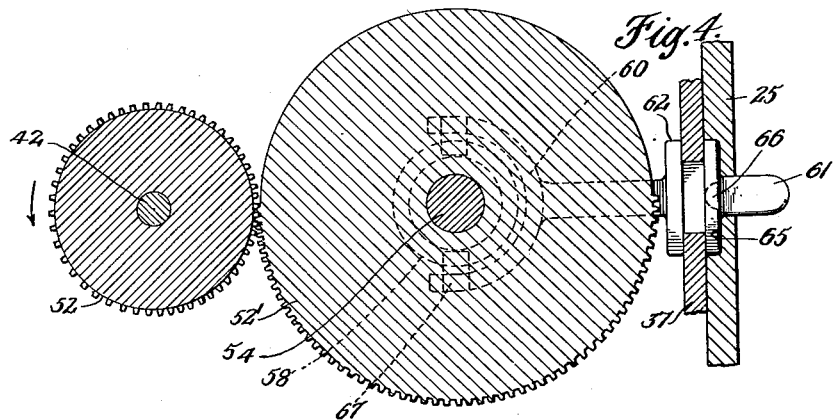
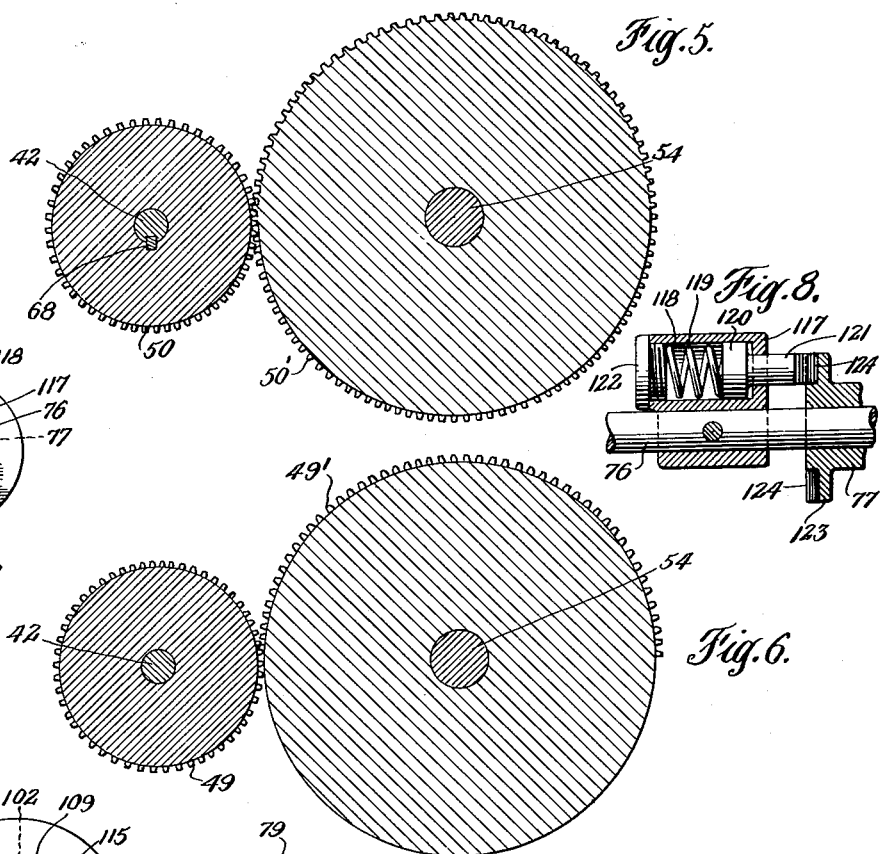
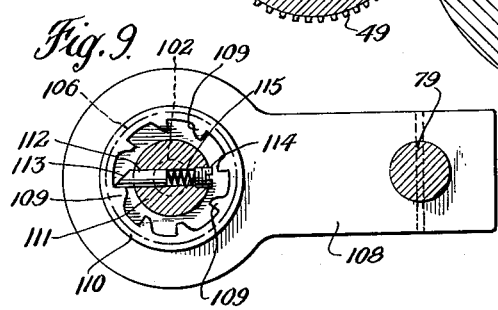
INVENTORS
Frederick M. Alexander
Harry C. Jones, Jr.
BY
ATTORNEYS.

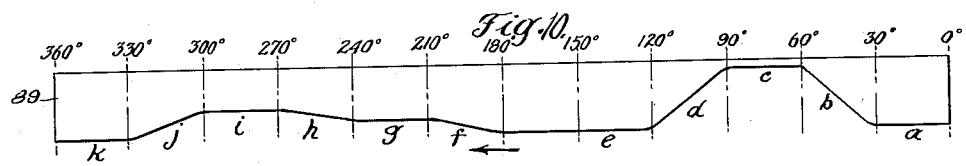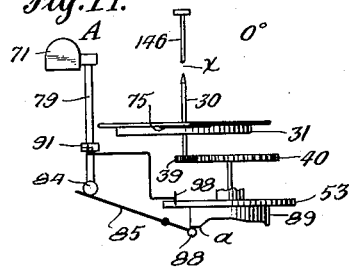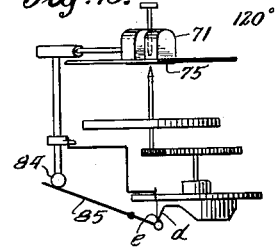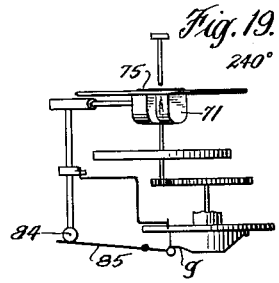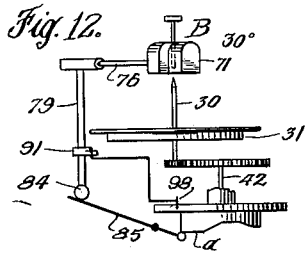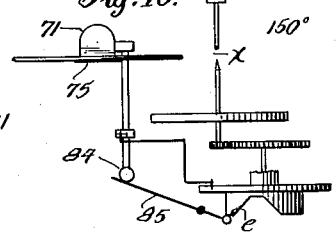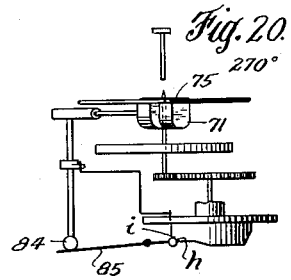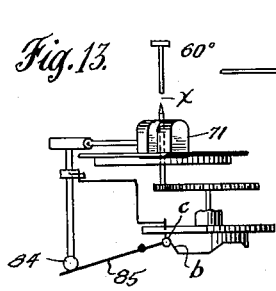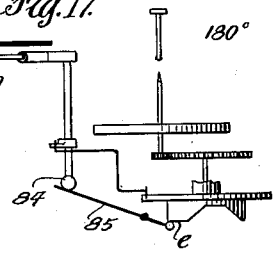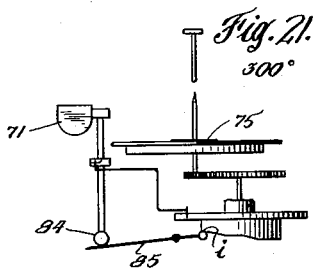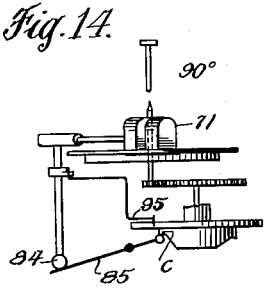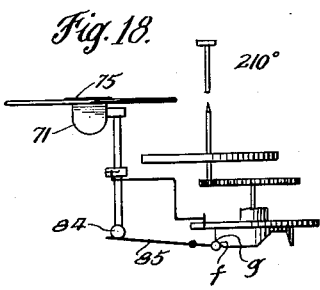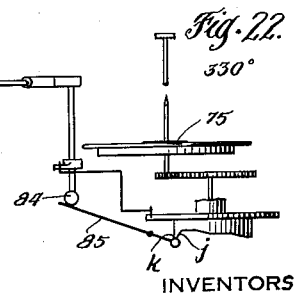

Sept. 20, 1955   F. M. ALEXANDER ET AL   2,718,400
RECORD-HANDLING DEVICES
Filed April 23, 1948   6 Sheets-Sheet 6
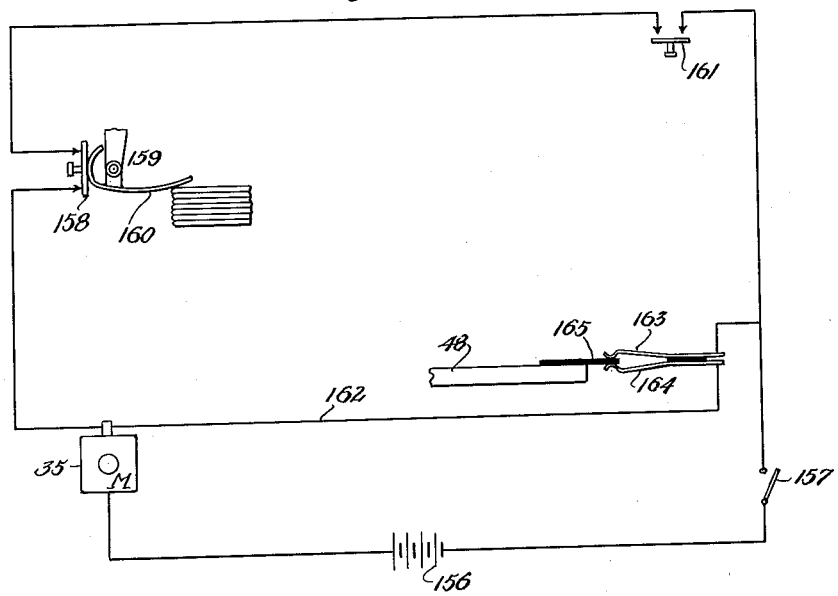
Fig. 23.
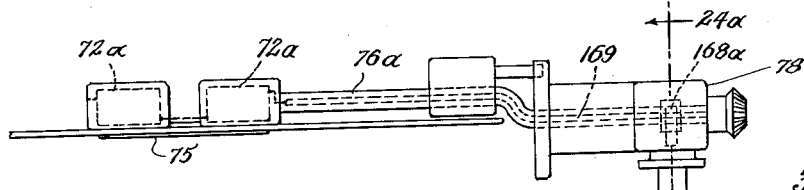
Fig. 24.
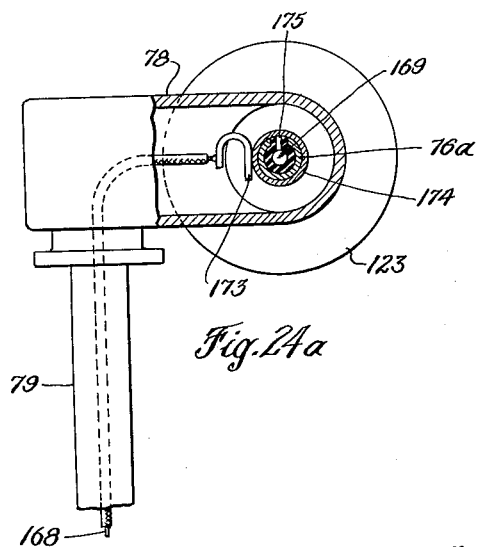
Fig. 24a.
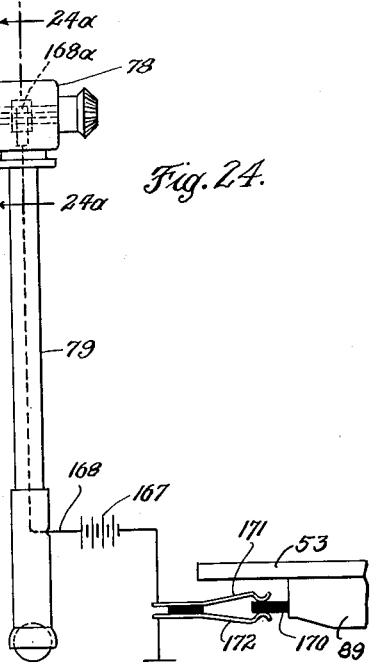
Inventors
Frederick M. Alexander
Harry C. Jones, Jr.
By
Attorneys

United States Patent Office 2,718,400
Patented Sept. 20, 1955

2,718,400

RECORD-HANDLING DEVICES

Frederick M. Alexander, Jackson Heights, N. Y., and Harry C. Jones, Jr., Haverford, Pa., assignors to Harry C. Jones, Jr., as trustee Application April 23, 1948, Serial No. 22,894

18 Claims. (Cl. 274—10)

This invention relates to phonograph record players and is particularly concerned with mechanism for removing a record from the turntable after one face of it has been played, turning the record over and returning it to the turntable in preparation for playing the other face.

One of the primary objects of the invention is the provision of mechanism which is simple in construction, thoroughly dependable in action, and inexpensive to manufacture and maintain. Another object of the invention is to provide record-turning mechanism which can be added to, or incorporated in, existing record playing equipment with a minimum of structural alteration. A further object of the invention is the provision of mechanism which will cooperate with conventional devices for playing a series of records in such a way as alternately to disable and to activate the parts which normally feed the records in a continuous series to the turntable. Thus, the feeding mechanism deposits the record on the turntable, and is then disabled. When the record has been played, the record inverting mechanism is activated to remove the record, turn it over, and restore it to the table. Then the record-turning mechanism is moved aside and disabled so that, when that side of the record has been played, the record-feeding mechanism will be re-activated and will drop another record onto the turntable. Other objects and advantages of the invention will become apparent as this description proceeds.

Generally considered, the operation with which this invention is primarily concerned is one in which a plate of magnetic material is placed beneath a record and a magnet is moved into position above it when it is desired to remove and turn the record. The magnet in the preferred embodiment of the invention is mounted upon an arm which swings to one side of the mechanism and there rotates through 180°. The record is held to the magnet while it moves by reason of the disc of magnetizable material. The magnet is then swung back into position over the phonograph turntable, where it is separated from the record and swung clear of the phonograph mechanism.

How the objects stated above are attained, and how the mechanism thus briefly referred to is constructed and operated will be apparent from a consideration of the following description, in which is set forth the preferred embodiment of the invention, as well as a desirable alternative. These embodiments are illustrated by the accompanying drawings, in which:

Figure 3 is a similar view taken at a lower level, namely, along the line 3—3 of Figure 1. In this view, parts of the device have been broken away so as to illustrate mechanism lying below them.

Figure 1:
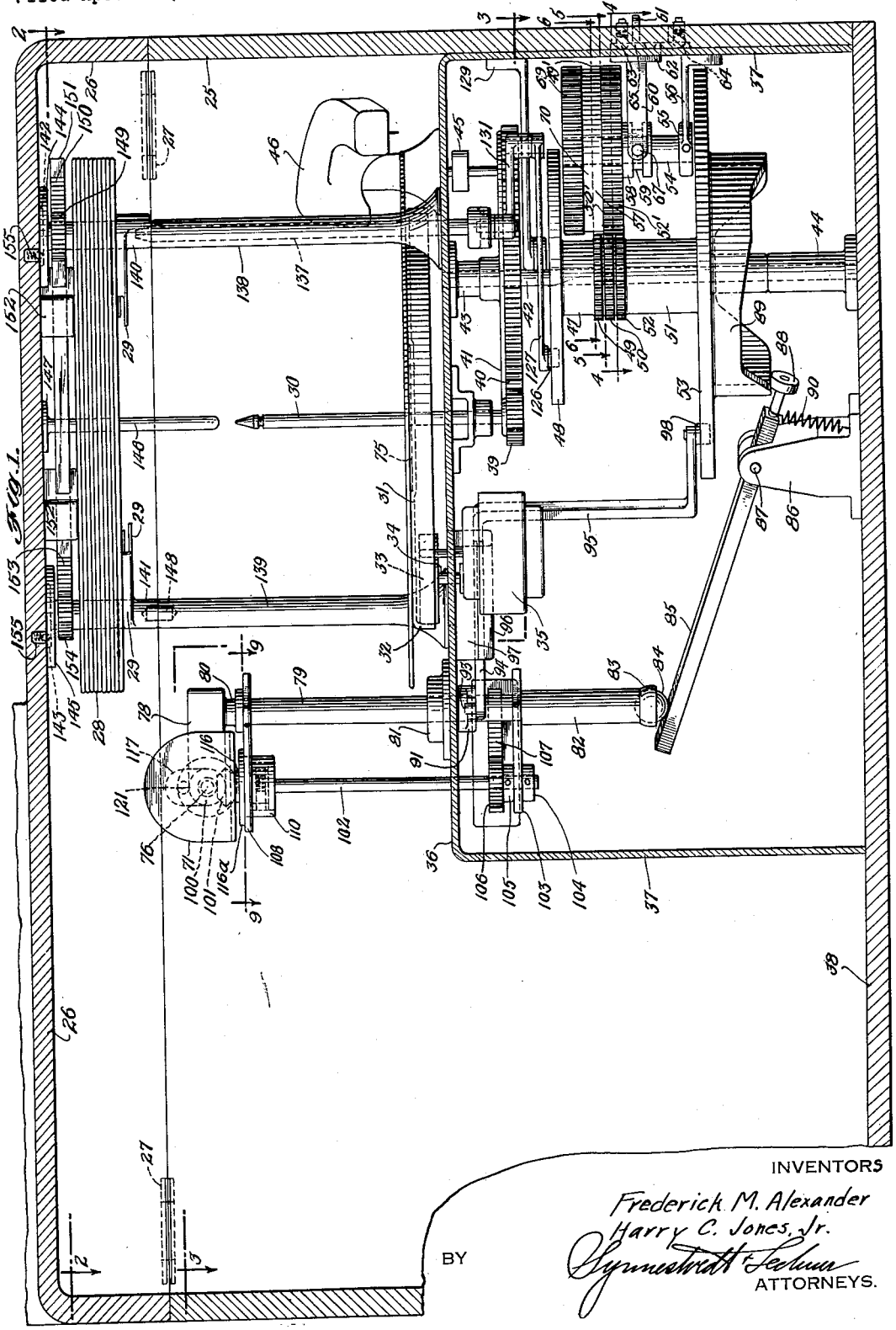
Figure 1 is a vertical section through a record player to which the invention has been applied, the section being taken substantially on the line 1—1 of Figure 3.

Figures 4, 5, and 6 are horizontal sections taken along the lines of 4—4, 5—5 and 6—6 respectively of Figure 1.

Figure 2:
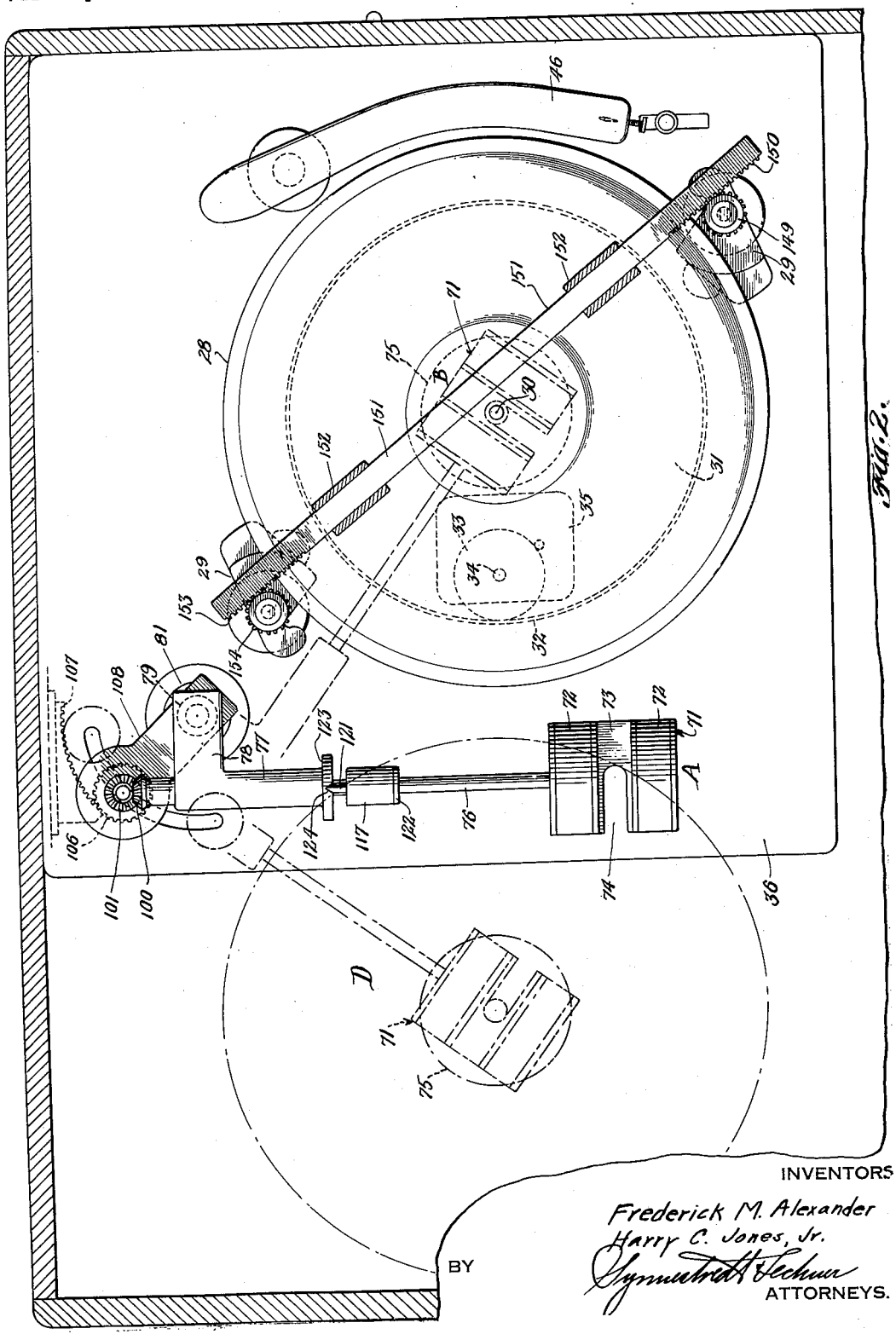
Figure 2 is a horizontal section of the device taken along the line 2—2 of Figure 1.

Figures 7 and 8 are views in elevation and vertical section respectively of a detail of the construction shown in Figure 2; Figure 8 being taken on the line 8—8 of Figure 7.

Figure 9 is a horizontal section of another detail of the mechanism shown in Figure 2 taken on the line 9—9 of Figure 1.

Figure 10 represents the developed profile of the cam member utilized in imparting vertical movement to the magnet arm assembly.

Figures 11 to 22 inclusive, are diagrammatic views of the apparatus, showing the relative positions of the parts corresponding to variations in the cam profile shown in Figure 10, and illustrating a complete cycle of movement of the magnet arm.

Figure 23 is primarily a wiring diagram, with certain parts shown in full.

Figure 24 is a partly diagrammatic view of an alternative embodiment of the invention.

Figure 24a is a detail, on an enlarged scale, taken of the line 24a—24a of Figure 24.

Figure 1 shows a record playing device having many familiar features, but having also the mechanism of our invention applied to it. The device is shown enclosed within a cabinet structure 25, provided with a lid 26 which is secured to the base of the cabinet by hinges 27—27 placed in the back. A stack of records 28 is shown, supported on slicing knives 29—29, above turntable spindle 30. The turntable spindle supports a conventional turntable 31, provided with a down-turned peripheral flange 32 which is adapted to be driven by the usual puck 33 through shaft 34 of motor 35. The motor 35 and the turntable spindle 30 are supported from the machinery base 36. This is formed from a single plate, the ends of which are turned down as at 37—37 to rest upon the floor board 38.

The lower end of the turntable spindle carries a pinion 39, which rotates with the spindle all the time the turntable is in motion. This pinion intermittently engages a driving gear 40 on the usual cycling cam 41, throw-out means of any suitable type (such as a wobble segment in the gear 40) being provided to ensure that the gear 40 will be driven through one and only one complete revolution each time the record-playing cycle ends.

The cycling cam with its peripheral gear is carried on, and pinned to, the main shaft 42 so that rotary motion in the cycling cam is always imparted to main shaft 42. Main shaft 42 is journalled in upper bushing 43 carried by the machinery base and in lower bushing 44 fastened to the floor board 38. The upper face of the cycling cam is not illustrated, because it is entirely conventional and forms no part of the present invention. It will be understood, however, that it carries conventional trip mechanism, responsive to movement of the tone arm 46, to initiate actuation of the cam, and also operating connections to the indexing mechanism 45, which controls the raising and lowering of the tone arm 46 and the inward and outward movement thereof.

The parts thus far described are well known in this art, and have been but briefly referred to for that reason. As shown in Figure 1, the parts are in a position of rest. The upper side of the record on the turntable has been played, the tone arm has been moved aside, and the "turning cycle" is about to be initiated.

Some distance below the cycling cam 41 on main shaft 42 is mounted the drop drum 47. This is not secured to the shaft, but is free to rotate about it, and it supports, and is fast to, drop cam disc 48 at its upper end and carries drop drum gear 49 at its lower end. Below the gear and drum just mentioned is a second gear 50, of equal diameter. This gear is keyed or otherwise secured to the main shaft 42, so that it must rotate whenever the cycling cam is in operation. For the sake of clarity, the gear 50 may be referred to as the transmission gear, for it is this element which transmits power from the cycling cam and its shaft to the respective mechanisms for dropping a fresh record or for lifting, turning and replacing a record.

Below the transmission gear 50 is the turn drum 51. This rides free on the main shaft, and carries turn drum gear 52 at its upper end and the swing cam 53 at its lower end.

Parallel to the main shaft 42 is a jack shaft 54, fixed in a rigid mounting ring 55 which is carried by side arm 56 fastened to the downward extension 37 of the machinery base. A gear cluster 57 is carried by this jack shaft, and all of the gears embodied in this cluster are either formed on the same drum or consist of a series of gears fastened together, riding free on jack shaft 54.

The cluster 57 may be shifted from its upper position, in which it is here shown, to a lower position by means of the collar 58, having a groove 59 in its periphery which is engaged by a shifter fork 60 mounted on the extension 37 of the machinery base. The fork may be moved from one position to another by any suitable device. As here shown, it is moved from the outside of the cabinet by a thumb piece 61 which extends from the fork-mounting flange 62 through a slot in the extension 37 and in the cabinet wall 25. This is more clearly seen in Figure 4. It is retained in either position by any convenient means, upper and lower ball catches 63, 64 being here illustrated. The mounting flange on the inner side of the slot in the extension 37 is matched by a corresponding plate 65 on the outside of the extension, housed in a suitable mortise in the cabinet wall 25. This plate is provided with indentations 66 adapted to register with the ball catches in a manner which will be obvious on inspection of this figure.

Cross-sectional views of the gears comprising cluster 57 are shown to best advantage in Figures 4, 5 and 6, these being on a somewhat larger scale than Figure 1. The trunnions 67 which couple the shifter fork to the grooved collar 58 are seen in dotted lines in Figure 4. It will be noted that the lowermost gear 52' of the cluster is shown in this figure. It is a mutilated gear, having teeth on only half of its periphery. As shown in Figure 1, its toothed section is in a position to engage turn-drum gear 52 on the main shaft.

Figure 5 shows the transmission gear 50, and its matching gear 50' of the cluster. The key 68 has been illustrated to show a convenient driving connection between the transmission gear and main shaft 42. It will be noted that cluster gear 50' is not a mutilated gear, but is provided with teeth throughout its circumference. The uppermost gear 69 of the cluster is similarly complete.

Figure 6 shows the drop drum gear 49 and its matching gear 49' which, like 52', is mutilated, being provided with teeth on only half of its circumference. In gear 49', however, the blind side is opposite to the blind side of mutilated gear 52'.

Since the transmission gear 50 must rotate whenever the cycling cam 41 and main shaft 42 are driven, it is apparent that the gear cluster must rotate at the same time, since gear 50 is in mesh with cluster gear 50' when the gear cluster is in position as shown in Figure 1. As a consequence, those of the cluster gears which mate with the drop drum gear and with the turn drum gear must also revolve. However, the ratio of the gears on the main shaft to those on the jack shaft is one to two, so that for every revolution of the main shaft, the gear cluster will make but half a revolution. Thus it happens that rotation of the transmission gear 50 first drives through the lowermost of the cluster gears, as illustrated in Figure 1, but when the cycling cam has made one revolution, the blind section of that lowermost gear (52') comes opposite the turn drum gear 52, so that the turn drum is no longer driven by gear 52'; and the toothed section of gear 49' comes opposite to drop drum gear 49. Therefore, on the next actuation of the cycling cam, drop drum gear 49 will be driven by its mate 49' on the jack shaft, while turn drum gear 52 will be disabled.

In this way it is provided that the turn drum will be actuated for one complete revolution and will then be disabled, and the next revolution of the cycling cam will operate to drive the drop drum for one revolution, whereupon that will be disabled and the turn drum will be actuated on the following cycle.

Since the drop cam disc 48 operates the mechanism which deposits a fresh record on the turntable, and the turn drum actuates the mechanism which turns the record over, it will be seen that the drive assembly just described automatically ensures the performance of these functions in alternation. It may, however, be desired to play a series of records especially pressed for use on machines incapable of turning the records. Under these conditions, the thumb piece 61 is depressed, lowering the shifter fork 60 and with it the gear cluster 57. Now the uppermost gear 69 of the cluster comes into engagement with the gears 49 and 50, wherefore any rotation imparted to the main shaft will cause the transmission gear to operate the drop drum gear alone, disabling the turn drum entirely. To ensure this result, the gear cluster is provided with a blind band 70, which, when the cluster is in its lower position, comes opposite turn drum gear 52. Thus the slicer knives will be actuated every time the cycling cam revolves, instead of on each alternate revolution only, and the record turning mechanism will be idle.

Conventional means may be provided to actuate the cycling cam if it should happen that the machine is started at a time when no record is in playing position.

*Turnover*

The novel mechanism utilized for turning the records includes as its primary element, a magnet 71. This may be of any suitable configuration so long as it has sufficient power to do the work. It may be of any suitable type, either temporary or permanent. Excellent results have been secured in using an "Alnico" permanent magnet. This name is a trade mark of the General Electric Co., and is applied to magnets composed primarily of aluminum, nickel and cobalt. The shape of the magnet is best shown in Figure 3, where, it will be seen, this element consists of two components 72—72, connected by a bridging plate 73 which is fastened to the components. The plate 73 is provided with an access slot 74, wide enough to pass the turntable spindle 30, and extending from the rim of the plate 73 inwardly to its center.

Since most records are non-magnetic, a disc 75 of magnetic material, such as ordinary sheet steel, having a central aperture to fit the spindle 30, is provided. This may be laid flat upon the surface of the turntable, but it is preferred to dish the central part of the turntable 31 slightly to receive the disc, so that the record will be supported over most of its area by the turntable and will not be carried entirely on the disc. The disc 75 is cut to register with the dished central section of standard disc-type phonograph records. Such records are ordinarily made with a circular label-receiving area of less thickness than the remainder of the record. It has been found that the space between the dished central areas of two records placed face to face is sufficient to receive the magnetic disc 75.

It is essential to provide three motions for the magnet 71. It must be mounted for swinging, lifting and falling, and rotation. Thus it may be swung into registry above the turntable spindle, lowered to pick up a record, lifted clear of the spindle, swung outwardly, turned over, swung back, lowered to clear the spindle, registered with the spindle, lowered so that the spindle will impale the record, swung out (leaving the record and the steel disc behind) turned over again, and then swung back into rest position.

Vertical and lateral support for the magnet are provided by the following construction shown in Figures 1 and 3. The magnet is mounted on a rod 76 journalled in sleeve 77 having a dog leg 78 firmly supported on the top of column 79 by the capitol 80. This column passes through a very heavy bushing 81 (preferably provided with ball or roller bearings) firmly secured to the machinery base 36. The lower end of the column 79 is provided with a contact bearing device, here shown as comprising a sleeve 82 having a socket 83 in which a ball 84 is housed. Alternative bearing arrangements, such as a sliding shoe, a roller, or the like will readily come to mind, however. This bearing engages a gallery or groove in the master lever 85, which is supported from the floor board 38 by way of a bifurcated fulcrum block 86 and clevis pin 87. On the inner, or short end of the lever 85, which extends beyond the fulcrum block is a cam follower 88 which engages the cam surface provided on the lift cam 89 formed as the lower portion of the swing cam 53. Since the fulcrum for the master lever is positioned to ensure multiplication of the movement of the cam follower in a pre-determined ratio, it is desirable to provide a weighted or spring-loaded counterbalance for the master lever and the magnet assembly which it supports. For present purposes thils is illustrated as a tension spring 90, extending between the short end of the lever and the fulcrum block. Obviously, motion-damping devices may also be used if desired to cushion the fall of lever 85.

It will be seen that rotation of the turn drum 51 (initiated from transmission gear 50, cluster gear 50', cluster gear 52', and turn drum gear 52) will cause rotation of the swing cam 53, and with it, lift cam 89. This will operate the master lever 85 in accordance with the lift cam profile, so as to raise and lower the column 79, which has freedom for vertical movement through the bushing 81. The column 79 will, of course, impart its movement to the dog leg 78 which is rigidly secured to it, thus raising or lowering the magnet arm and magnet.

Swinging movement of the magnet arm is provided by the following mechanism:

The column 79 is not only free to move vertically in the bushing 81; it also is free to rotate therein. Below the machinery base, this column carries a crank 91 which is splined to it. The crank 91 is slotted at 92, and a stud 93 rides in this slot. The stud is mounted at one end 94 of swing lever 95, which lever is in the form of a bent rod, supported in channel bearing 96 which is mounted from the under side of the machinery base by channel bracket 97. Thus the upper section 94 of swing lever 95 is free to slide to and fro in the channel bearing 96, but is prevented from oscillating in a horizontal plane.

The lower end of the swing lever 95 carries a cam follower 98 which rides in cam track 99 (see Figure 3) formed in the upper surface of swing cam 53. Since swing cam 53 is functionally integral with turn drum 51, it will be seen that rotation of the latter will cause the swing cam follower to move radially in and out with respect to the center of the swing cam disc, thereby causing the upper end of the swing lever, through stud 93, to oscillate the crank 91 which is splined on column 79. Thus rotation of the turn drum, which is functionally integral with swing cam disc 53 and lifts cam 89, will ensure operation of the swing lever in timed relation to movements of the master lever.

Turn-over movement is imparted to the magnet by rotation of the rod 76. This rod passes entirely through sleeve bearing 77 and carries on its inboard end a bevel gear 100, which meshes with bevel gear 101 which is clutched to spin shaft 102 (see Figure 1). Support for the spin shaft 102 is provided at the lower end by bracket 103 which is secured to column 79 and is firmly held in place, resting on the upper end of sleeve 82. Since it is important that the position of this shaft should be accurately maintained, the shaft is provided with a lower collar 104, secured to it as by a pin or set screw. Above the spin shaft bracket 103 a second collar 105 is mounted on shaft 102. This collar is also secured to the shaft by any appropriate means, such as a pin or set screw, and carries the spin shaft driving pinion 106, which is functionally integral with it. Rotation is imparted to the spin shaft during a part only of the swinging movement of the magnet arm 76, by reason of the provision of an arcuate rack 107, concentric with the column 79. This arcuate rack 107 is mounted on one of the rear walls 37 of the machinery base, care being taken to ensure that it is at the proper height and in position to engage spin shaft pinion 106 throughout the desired portion of the swinging movement referred to.

The upper end of the spin shaft assembly is supported by clutch bracket 108 secured to column 79. This carries on its under side a housing 110 for the clutch mechanism, illustrated in detail in Figure 9, through which the top of spin shaft 102 is connected to bevel gear 101. For purposes of illustration, the clutch is shown in the form of a dog-tooth ratchet coupling.

The dogs 109 of this coupling are formed on the inner wall of a cup, the collar of which, as seen at 116 in Figure 1, passes through the clutch bracket 108 and the washer 116a, to engage and support the bevel gear 101. The upper end of spin shaft 102 is provided with a head 111, which is transversely bored as at 112, the dog tooth 113 being mounted in this bore. The opposite end of the bore carries a set screw 114 between which and the inner end of the dog tooth a compression spring 115 is placed which urges the dog tooth into engagement with the dogs 109. It will, of course, be obvious that any type of overrunning clutch may be substituted for this mechanism, the important point being the transfer of uni-directional motion to the bevel gear 101. It will be seen that elevation of the column 79 will bring the spin shaft pinion 106 into the same horizontal plane as the arcuate rack 107.

At the point in the cycle illustrated at A in Figure 3, rotation of swing shaft cam 53 will cause the cam follower 98 to move inwardly towards the center of the swing cam. This motion will cause swing lever 94–95 to pull the magnet in towards the spindle 30, by rotating column 79 through the instrumentality of forked crank 91. Movement in this direction will swing the spin shaft pinion 106 away from the left-hand end of the arcuate rack 107.

The magnet will be held level throughout this movement by the catch mechanism illustrated in Figures 7 and 8. This mechanism comprises a casing 117 which is pinned to the shaft 76 so that it must rotate with that shaft. The upper part of this casing is bored to provide a cylinder 118, in which compression spring 119 is mounted behind the head 120 of a latch bolt 121. The latch bolt 121 passes through an aperture in the wall of casing 117. The spring 119 is seated on the stud fastening 122. The sleeve bearing 77 for magnet rod 76 is provided with a flanged end 123 in which notches 124 are formed, these being 180° apart. It will be seen on inspection of Figures 2 and 3 that the latch bolt 121 is pointed to engage the notches 124. The power of spring 119 is so calculated as to hold the magnet arm in either its upper or its lower position as against any tendency to rock out of alignment. However, when rotation is imparted to the magnet arm, the force is more than sufficient to compress the spring 119 and move the latch bolt 121 into the cylinder 118 so as to permit rotation of the magnet rod 76 through 180°, at which point latch bolt 121 engages the lower of the notches 124, thus holding the magnet in inverted position until further rotation is imparted to it by way of the bevel gears 100–101.

With the magnet held in the position shown at A in Figures 1, 2, and 3, the magnet arm as a whole is caused to swing inwardly by way of the swing lever mechanism referred to just above until it registers with the turntable spindle 30. The bridge plate 73 clears the point of that spindle and passes beyond it. Rotation of the turn drum 51, and with it the lift cam 89, is now effective to lower the magnet into engagement with the record. Further rotation of the turn drum raises the magnet, the record, and the steel disc 75 to a point at which the steel disc will clear the top of the spindle 30. Meanwhile, continued rotation of the drum 51 causes the cam follower 98 to move radially outwardly on the swing cam disc 53. This outward movement swings the magnet arm back to the position shown at A in Figure 2, but now carrying the record and the steel disc 75. At this point, spin shaft driving pinion 106, which has been riding free beyond the left-hand end of arcuate rack 107 comes into engagement with rack 107.

Further outward movement of the swing lever 94—95 causes the spin shaft pinion 106 to ride on the rack 107, thereby imparting rotation, by way of bevel gears 101—100 to the magnet rod 76. In Figure 3, the magnet, record, and disc are shown in dot-dash lines at position C, with the magnet half-inverted. Figure 2 shows the magnet and record in dot-dash lines in position D. In this position, the spin shaft pinion 106 has ridden along the arcuate rack 107 almost to the right-hand end of that rack. The magnet is now inverted. The disc 75 is above the record and the magnet is below it.

With the parts in position D shown in Figure 2, the swing cam follower 98 will be in its outermost position on the swing cam disc 53, 180° away from the position it will occupy when the magnet is as shown in full lines in Figure 3, the swing cam disc 53 having moved to that position during the cycle of operations just described.

The movement of the swing lever 94—95 is controlled, as has been noted above, by the swing cam follower 98 which rides in cam track 99, in the swing cam 53. On inspection of Figure 3, it will be seen that counter-clockwise rotation, as indicated in that view, first causes the cam follower to move inwardly so as to swing the magnet into position B shown in dot-dash lines in Figure 2. The magnet rides in this position for approximately one-fourth of a revolution of the cam. During this interval, the lift cam and its associated parts lower the magnet into contact with the record and raise it again to a point at which the magnet and the disc will clear the top of spindle 30. During the next part of the cycle, the cam track 99 moves the cam follower 98 radially outward. After this radial outward movement has progressed to a point approximately corresponding to position A in Figure 3, of the magnet, a bend in the cam track 99 is provided so as to reduce the speed of outward swinging movement momentarily, in order to afford more gradual swinging movement as the spin shaft pinion 106 begins to track on the arcuate rack 107. Thus, rotation of the magnet rod 76 is not initiated with undue abruptness. Beyond this jog in the cam track 99, the track swings again radially outwardly until the magnet has reached its extreme outer position, indicated at D in Figure 2. At this position, the swing cam will have rotated through 180°, the location of the cam track being shown in Figure 3 diametrically opposite to the cam follower in that view.

Continued rotation of the swing cam 53 brings the magnet arm back towards its extreme inner position B. A momentary dwell is provided by way of another bend in the cam track 99 at the 210° position, this being so placed as to afford ample opportunity for the lift cam 89 to adjust the vertical position of the column 79 in such a way as to ensure that the record in its new position above the magnet will clear the top of spindle 30. From this point, continued rotation of the swing cam 53 brings the follower 98 closer to the center of the swing cam disc so that the magnet, record, and steel disc are eventually swung into position above the turntable spindle 30. This position is the same as that shown at B in Figure 2, except that the magnet is now below the record and the access slot 74 opens towards the upper right corner of the view rather than towards the lower left corner (the latter being the position shown in dot-dash lines in Figure 2 at the initiation of the record-lifting movement).

A brief dwell is provided at this point, during which interval the magnet arm is lowered somewhat so that the spindle enters the central aperture in the record and the steel disc 75. Now the cam track causes the follower 98 to swing the magnet arm outwardly to position A, shown in Figures 1, 2, and 3. However, the magnet in this position is, so to speak, top side down. Consequently the cam track 99 is laid out in such a way as to cause further outward movement of the cam follower 98 and, with it, the swing lever and magnet arm assembly. In this further outward movement, spin shaft pinion 106 once more engages the arcuate rack 107 causing rotation of the magnet 72 through another half-revolution. Thereafter, cam track 99 leads the follower 98 back towards the center of swing cam disc 53, returning the magnet to position A of Figure 3, which is the position of rest. During the last portion of the movement just described, the indexing mechanism 45, driven from the cycling cam 41, has moved the tone arm 46 into position above the first groove of the record.

*Record feed*

The cycling cam has now completed one full revolution and has come to rest. It will not be activated again until tripped by the tone arm 46. When this occurs, the next revolution of the cycling cam will not activate turn drum 51, because the mutilated gear 52′ which drives this drum will have turned through a half-revolution, so that the blind section of this mutilated gear will now be opposite turn drum gear 52. On the other hand, mutilated gear 49′ will also have turned through one-half revolution, so that its blind section will have passed drop drum gear 49, and its toothed sector will have engaged that gear. Consequently, actuation of the cycling cam is now effective to cause rotation of the drop cam 48, while the turn drum 51, the swing cam 53, and the lift cam 89 remain idle.

Actuation of the drop cam 48 causes the record-feeding mechanism to operate. For present purposes, the record-feeding mechanism illustrated is of the type in which the records are supported on slicer plates, and oscillation of the mechanism brings a pair of slicer knives into position to afford temporary support while the plates move aside to drop one record onto the turntable.

Ordinarily, the mechanism for actuating the slicer knives 29 is formed as a part of the cycling cam 41. The slicer mechanism, therefore, is actuated every time the cycling cam rotates. Since the apparatus of the present invention requires that the slicer mechanism should remain idle each alternate revolution of the cycling cam, the mechanism shown in the drawings has been provided. This is characterized by a drop cam 48 which is separate from the cycling cam 41, and is driven from the gear cluster 57 on jack shaft 54.

The mechanism for actuating the slicer knives 29 is to a large extent conventional. It will be seen that the drop cam disc 48 is provided with a drop cam track 125 in which rides the drop cam follower 126. Motion is transmitted from the cam follower 126 to the drop lever 127 which is pivoted at 128 on side arm bracket 129, the latter being secured to vertical wall 37 of the machinery base. The outer end of drop lever 127 is pivotally connected at 130 to drop link 131 which, through pivot 132 actuates drop crank arm 133. Drop crank arm 133 is keyed or otherwise secured to the slicer rod 137. This rod, or shaft, 137 passes through record post 138 in the conventional manner.

In most record players of this general type, in which the records are fed by slicer-knife mechanism, a pair of slicer-knife units is employed, and these respective units are actuated through slicer shafts mounted one in each of the record supporting posts. Simultaneous operation of these units is provided by cross-connecting the slicer shafts below the level of the machinery base. In order to increase the accessibility of the present mechanism, the parts for interconnecting the slicer shafts are not placed below the machinery base, but are carried on the lid of the cabinet. Consequently, post 139 is merely a hollow column, and does not house a slicer shaft.

An extremely simple and convenient arrangement has been provided for "loading" the machine and for feeding records from the load to the turntable. Instead of mounting this portion of the apparatus on the posts 138—139 in the conventional manner, we have provided stub posts 140—141, each stub having a flanged end 142—143 carried in a recessed collar 144—145. The collars are secured to the lid 26, and are so positioned that the stub posts 140—141 will mate with the main posts 138—139 when the lid is in closed position. Appropriately located between the recessed collars 144—145 is stub spindle 146 which is adapted to register with the central apertures in the records and to lie directly above turntable spindle 30. This spindle is secured to the lid by any convenient means, preferably by providing it with a flange 147, which is fastened in place by screws.

When the device is to be loaded, the slicer mechanisms are rotated by hand, out of the way entirely, and records are simply stacked on the stub spindle 146 as desired.

In order to ensure that the stub posts 140—141 will register with the main posts 138—139 when the lid is closed, it is desirable to provide them with nesting tips and sockets. The upper end of slicer shaft 137 is provided with a tapered tip which is received in a correspondingly formed socket in the lower end of stub post 140, these parts being so configured as to establish a positive driving relationship when the lid is in closed position. A guiding pin 148 is sweated into the end of main post 139 and this registers loosely with an appropriate conical seat in the lower end of stub post 141. It will be understood that, although the main posts 138—139 are secured to the machinery base 36 in fixed position, the stub posts 140—141 are capable of rotational movement, so as to oscillate the slicer-knives 29—29.

It has been mentioned that, according to the present invention, the cross-connection for driving one slicer mechanism from and in synchronism with the other is not placed below the machinery base but is mounted in the lid. This mechanism may be briefly described as follows:

Stub post 140 carries at its upper end pinion 149 (see Figure 2) which engages the rack 150, which is formed on slicer bar 151. Twin supports for the slicer bar, in the form of channel bearings 152 are secured to the lid 26 in any suitable manner. These provide for longitudinal movement of slicer bar 151 but prevent oscillation or rotation of that bar. The opposite end of slicer bar 151 is provided with a corresponding rack 153 which engages pinion 154 on the upper end of stub post 141. Through this mechanism, rotation of the slicer shaft 137 is transmitted to stub post 140 and the slicer-knives which are associated with it and stub post 141.

The channel bearings 152 are preferably built with lower surfaces considerably more extensive in area than the size of the bar would necessitate. This is because these surfaces are relied upon to support the records when the lid is in open position and the machine is being loaded.

After loading the machine, it is important to re-orient the slicer-knives 29 properly, particularly to ensure the correct angular relationship between the slicer shaft 137 and the stub post 140. Ball checks 155 are mounted in the lid for this purpose. These mate with suitable indentations in the flanges 142—143 of these posts, and aid in manually positioning the posts during and at the conclusion of the loading operation. Thus re-establishment of the disconnectible joint between driving member 137 and driven member 140 is facilitated.

It might be noted in passing that loading of this apparatus proceeds in inverse order to conventional practice, for the first record placed in the magazine will be the last one to be played.

The slicer-knives 29 are operated from the drop cam disc 48, as described above. The layout of the drop cam track 125 on that disc will not be described in detail since it is entirely conventional. It is well understood in this art that the main drop lever must transmit a sufficient degree of movement to the slicer shaft to cause the slicer-knives to move in and support the record next above the bottom record of the stack while the bottom record drops to the turntable. A further cycle of movement shifts the slicer-knives outwardly, and permits the record which was previously supported by them to drop into a position of readiness for the next actuation of the drop cam.

The next actuation of the drop cam 48 will operate the cam follower 126 and thereby oscillate drop lever 127 about its pivot 128. This will in turn oscillate link 131 and crank 133, causing rotation of the slicer shaft 137. When this is transmitted, by way of the tip and socket coupling, to stub post 140, it will cause the blade of the slicer-knife assembly 29 on stub post 140 then in engagement with the lowest record to swing aside; and, since stub post 141 is constrained to move in unison with stub post 140 by reason of the racks on slicer bar 151 and the pinions on the respective stub posts, the corresponding blade of the slicer-knife assembly on stub post 141 will likewise swing aside, so that the lowermost record will drop to the turntable. To guide the record properly, turntable spindle 30 is preferably provided with a conical upper end, which "finds" the hole in the center of the record and leads it into the proper position.

It is, of course, recognized that the slicer mechanism above described for feeding records in series is not the only available type of apparatus for performing this function. Alternative mechanisms are well known and widely used, and most if not all of these can readily be mounted to afford a gap between magazine and turntable to permit the turnover mechanism to function, without preventing the ready transferal of records therebetween.

As illustrated herein, there is a relatively small gap between the bottom of the stub spindle and the top of the turntable spindle. We have found that this gap may be substantially greater, if desired, so that more room will be provided for removing and restoring the record to be turned. In fact, particularly with less bulky magnets, this gap may be sufficiently great to avoid the need to lower the magnet in its return motion. This increase in the gap does not seem to involve any substantial risk of damage to the record.

Other protective features to avoid record damage have been employed by us. We prefer to encase at least the working face of the magnet in some soft, protective covering, such as chamois, velvet, or other piled fabric. Then, when the record has been impaled on the spindle, the magnet may be slid across it without risk of injury.

The drawings illustrate a small groove encircling the spindle 30 near its tip. This groove also serves as a protection to the records. The lateral pull of the magnet after the record has been impaled, draws the rim of the centering aperture in the record into this notch. Thus the record is held level until the magnet has moved beyond the rim of the steel disc. This delays the fall of the record just enough to prevent it from tilting at a sharp angle, which tilting action would otherwise tend to chip away the rim of the centering aperture, and make the hole "wear oval." That, in turn, would make for eccentricity, so that a "wow" might develop during playing.

Lift cam cycle

An important element of the mechanism for using the present invention is the lift cam 89. The profile of this cam is developed in Figure 10, each division of this figure representing thirty degrees of its circumference. Since the cam rotates in a counterclockwise direction, 0° is shown at the right of the figure, and 360° at the left. Below the profile view of Figure 10 are given in sequence a number of diagrammatic illustrations of the mechanism, each 30° from the preceding view. Correlation of the profile with the position views given in Figures 11 to 22 inclusive will make the entire operation of the lift cam cycle very clear.

The mechanism as illustrated in Figures 1 and 11 is in the position represented by the 360° or 0° indications of Figure 10. This is the position of rest. If, now, the cycling cam 41 be actuated by operation of the trip mechanism controlled by tone arm 46, clockwise rotation of turntable spindle 30 will impart counterclockwise rotation to the main shaft 42 by way of pinion 39 and driving gear 40 on cycling cam 41. Such rotation of the main shaft will cause transmission gear 50 to turn in the same direction, since it is keyed to the main shaft. This will cause the gear cluster 57 to revolve in the opposite direction, thus bringing the toothed side of mutilated gear 52' into driving relation with turn drum gear 52 and actuating the turn drum 51, swing cam 53, and lift cam 89.

At first, no motion is transmitted to lift cam follower 88 by such rotation, since that follower rides on the level land *a*. During this time, however, swing cam follower 98 has been drawn inwardly of swing cam disc 53 by cam track 99, thereby bringing the magnet into position above turntable spindle 30, the solid portion of the bridging plate 73 which unites the magnet elements passing through the gap between turntable spindle 30 and stub spindle 146. This position is indicated in Figure 12.

Between 30° and 60° of the cam profile, is inclined plane *b*. Cam follower 88 rides up this incline, thus permitting master lever 85 to rock and thereby lower column 79 and the associated parts of the magnet assembly. In Figure 13, the magnet has just been lowered into contact with the record, and swing lever 95 is in its most inward position with respect to swing cam disc 53.

Upon reaching the 60° point, the cam profile levels out at land *c*, corresponding to the concentric path of swing cam track 99, so that a brief dwell is provided while the magnet picks up the disc 75 and with it the record to be turned. This is especially desirable if a dash pot or other motion-dampening agency is used to cushion the fall of the magnet. It will be seen that Figure 14 is essentially the same as Figure 13, except for a 30° shift in the position of the cam.

Leaving the 90° point, the cam profile follows a downward incline *d*, footing at the same level as land *a*. The lift cam follower 88, following this incline, is forced downwardly, thus raising the opposite end of master lever 85, and with it, the magnet assembly carried on column 79. In Figure 15 the magnet, having picked up a record, is in its uppermost position, corresponding to the 120° line in Figure 10.

Now the cam track is level, and on the same plane as land *a*. The lift cam follower 88 rides along this run *e* of the cam without raising or lowering the master lever 85, but the swing lever 95 moves radially outwardly of the swing cam disc, thus swinging the magnet, disc 75, and record almost clear of the apparatus. This is the position shown in Figure 16.

It is at the 150° point of Figure 10 that the spin shaft pinion 106 makes contact with the arcuate rack 107 and initiates rotation of the magnet arm 76 by way of the bevel gears 101 and 100. While lift cam follower 88 continues to ride on level land *e* of the lift cam, swing lever 95 continues to move outwardly of the swing cam disc, causing further swinging movement of the magnet arm, and rotation of the magnet. In Figure 17, the magnet has rotated through 180° and is in inverted position, the record being directly above it, and the steel disc 75 above that.

The next phase of the cycle begins the operation which we refer to as "registering." Since the magnet is supported in the mechanism as illustrated at a point above the plane of the record, inversion of the magnet will raise the record to a higher plane. If it were swung inward at this level, it would hit the stub spindle 146. Consequently, a gradual incline *f* is provided in the cam profile, between 180° and 210°. This is calculated to effect a lowering of the magnet assembly to such a point that the record will readily pass the gap X between the turntable spindle 30 and the stub spindle 146. During this lowering movement, the swing lever 95 is bringing the magnet arm back towards the turntable. Spin shaft pinion 106 is rolling along arcuate rack 107, but the over-running clutch prevents this gear from imparting further rotation to the magnet rod. Figure 18 shows the record at the proper level, with the lift cam follower 88 about to enter upon level land *g*.

During the next 30°, the level of the magnet does not change, but inward swinging movement of the swing lever and therefore of the magnet arm continues, the record passing through the gap between spindles 30 and 146 until its central aperture is directly above the pointed upper tip of spindle 30. (See Figure 19.)

As soon as the record is properly positioned above the turntable spindle, the master lever gently lowers it until it is below the spindle point. This is provided by way of the very gradual incline *h* between the 240° and the 270° intervals, in the cam profile of Figure 10. The swing lever, of course, remains motionless during this operation. Figure 20 represents this condition.

When the record has been properly registered on the turntable spindle 30, swing cam track 99 forces swing lever 95 radially outwardly. This causes the magnet to pull away from beneath the record and steel disc 75, these latter parts being impaled upon the spindle 30, while the magnet is not, since, in its inverted position, access slot 74 opens away from the direction of movement, and spindle 30 passes through this slot. As soon as the magnet is clear of the rim of the record, the latter drops into playing position, with the steel disc above it, while the magnet returns to the position shown in Figure 21.

The last phase of the cycle raises the magnet assembly by causing the lift cam follower to ride to the level of land *k*, incline *j* being provided for this purpose. At that level, spin shaft pinion 106 again engages arcuate rack 107, thus turning the magnet over as swing lever 95 moves it outwardly. Figure 22 shows the completion of this movement. All that remains is to return the assembly to the position of rest, this being the position shown in Figures 1 and 11.

The magnet assembly will now remain in the position of rest while two playing operations occur. First, the record just turned over will be played; the cycling cam will be actuated by the tone arm trip; it will operate to drive the drop cam, because the blind side of mutilated gear 52' will be opposite to the turn drum gear 52 but the toothed side of mutilated gear 49' will be in engagement with drop drum gear 49. The drop cam will therefore be actuated, to drop a fresh record to the turntable, while the magnet assembly is disabled. Then the upper side of the fresh record will be played. Not until this has been finished, will the cycling cam actuate again the turn drum and magnet-moving elements.

It will be realized that the steel disc 75, which was initially on the turntable 31 below the first record played, was left above that record as a result of the inversion of the record by the magnet. It will therefore be directly below the fresh record which drops from the slicer knives. When the entire series of records has been played, the steel disc 75 will be on top of the stack of records on the turntable. Therefore, it can readily be removed when the played records are taken off the machine, and restored to its place on the turntable 31.

A minor feature of the synchronizing of the various movements is the provision of means to prevent unintended rotation of the drop drum 47 and of the turn drum 51. In the edge flange of the drop cam disk 48 a notch or depression 134 is provided. This is placed so that it will come directly opposite to the upper horn of a bicornate bracket 135, which is mounted on the back wall 37 of the machinery base support, when the drop cam is in its rest position. A ball check or cupboard catch 134a is carried on the end of the upper horn of the bracket. This mechanism is very similar to the centering latch mechanism 117 on the magnet arm. Its only function is to ensure that frictional forces originating in the mounting of the drop drum on the same shaft as the turn drum will not gradually rotate the drop cam disc when it is supposed to be idle. Corresponding arrangements are made to ensure that the turn cam will not rotate when the drop cam operates, the lower horn of the bicornate bracket 135 being located at the level of a depression or detent 136 formed in the cylindrical wall of lift cam 89, in a position to cooperate with the lower ball check 136a.

Electrical controls

It is desirable that the player should continue to operate as long as there is a record to be played, but should cease operating when the last side of the last record of the stack has been played, without further attention from the operator. To provide this characteristic, we propose to interpose two automatic control switches in the motor circuit, in addition to the master switch which is normally provided. A suitable wiring diagram for this purpose is shown in Figure 23. The motor 35 is here indicated as a rectangle marked "M." Current to operate it is supplied from the usual source—most commonly ordinary household current—here indicated by the conventional symbol for a battery, shown at 156. One line of this circuit passes through the master switch 157, which is usually mounted on the machinery base in a convenient location near the tone arm 46. The other portion of this circuit runs from the motor to a cut-out switch 158. This switch is preferably a simple toggle switch. It is normally closed. It is controlled by the gravity-operated bell crank 159, mounted on the lid. It will be seen that, as illustrated, the short arm of this crank is arcuate, and that the lever as a whole is pivoted at a point below the center of the arc. The long arm 160, when the lid is in closed position, rests on the uppermost record of the stack to be played, and follows this record as the records beneath it are fed, one by one, to the turntable. When the last, or uppermost record has dropped to the turntable, the long arm 160 drops down to a position in which the short arm is swung away from the switch points, so that the switch will snap into open position.

To ensure that the motor will not be left running when the lid is carelessly left open (so that the gravity-operated cut-out switch 158 is inoperative) a push-button switch, of the type commonly used on refrigerator doors to control the light is placed in series with the cut-out switch 158. This element is marked 161. It operates to close the circuit when the lid is closed, but to open it when the lid is open.

If no other provision were made, the machine would cease to play as soon as the last record dropped to the turntable. Consequently, we provide a shunt 162, which is normally closed, and which completes the circuit from the master switch to the motor without regard to the position of cut-out switch 158 or push-button switch 161. In this shunt line we provide a spring contact assembly 163, 164, the mating leaves of which are normally in engagement. These mating leaves, 163, 164, however, are mounted, preferably radially outwardly of drop cam disc 48, on the upper horn of the bicornate bracket 135 (see Figure 3). On the upper surface of drop cam disc 48 a tongue 165 of "Bakelite" or other insulating material is fixed. This tongue projects radially outwardly from the edge of the drop cam disc, and is so positioned that it will separate the mating leaves 163, 164 each time the disc rotates. This will break the shunt line, but will not stop the motor if the cut-out switch 158 and the push-button switch 161 are both closed. If, however, the cut-out switch is open, the last record having been dropped, this break will stop the motor, and it will not start again until there is a record in the record rack and the lid has been closed.

The sequence of operations will be clear if it is followed through. Suppose that only one record remains in the playing rack. It supports the long arm 160 of the bell crank, and the cut-out switch therefore remains closed while the record dropping mechanism comes into operation. This operation is caused by rotation of the drop cam disc 48, and rotation of the drop cam disc moves the tongue 165 toward and through the leaves 163, 164. The shunt circuit will be momentarily broken but a completed circuit to motor will still be maintained through cut-out switch 158 which remains closed. The motor therefore continues to run while the slicer-knives drop the last record to the turntable, opening cut-out switch 158. Even then it continues to run, because the shunt is now closed and the drop cam disc 48 ceases to rotate before the tongue 165 again enters between the leaves 163, 164. Therefore, the record on the turntable is played; the turn drum is actuated; and the record is turned over and is played on the opposite side before the drop cam disc 48 is actuated again. But the first few degrees of rotation of the drop cam disc will again bring the tongue 165 between the leaves 163, 164. This will break, or open, the shunt; and, since the cut-out switch is now also open, will stop the motor.

It is apparent that variations in the mechanism may be made without departing from the basic features of the invention as described. One important alternative is to substitute an electromagnet for the permanent magnet described above. This may be accomplished quite easily as, for instance, by mechanism diagrammatically indicated in Figures 24 and 24a. The source of current should, preferably, be uni-directional. This suggests the use of a storage or other battery, a rectifier, or a connection from the plate circuit of the amplifying system normally used in record players. Alternating current may, indeed, be used, but there is some risk that the record may slip out of position when the magnet is rotated to turn it over. This depends on the nature of the magnet used; if it retains sufficient residual magnetism to keep the disc 75 in place throughout the shift in polarity, it can be used with excellent results.

We prefer to ground the circuit (conventionally indicated at 166) on the machinery base extension 37 where a battery 167 is employed. The other pole of the battery is connected to an insulated flexible wire 168 which passes through a hole in the column 79, up the column, and through the dog-leg 78, where it is brush-connected as at 168a to a rigid, insulated conductor 169 passing through a tubular magnet rod 76a. One advantage of the electromagnet is that a smaller mass will afford equivalent lift, so that the loading on the lever arm which is the magnet rod may be reduced. Also, it is easier to offset the plane of the magnet somewhat from the axis of the magnet rod, without introducing excessive unbalance. If this is done, the plane of the record and bridging plate will contain the axis of the magnet rod both before and after the record has been inverted, and it will not be necessary to "register" the record on its return towards the turntable in order to clear the top of turntable spindle 30 and the bottom of stub spindle 146. The return circuit, after the current from conductor 169 has passed through the electromagnet 72a, is completed by simply grounding the line on the magnet arm.

The flow of current is controlled by the same type of mechanism as has been described above with reference to the drop cam disc. A tongue or pin of Bakelite 170 is set into the vertical cylindrical part of lift cam 89, and this is so positioned that it normally separates two leaves 171, 172, interposed in the magnet circuit. As soon as the cam begins to rotate, however, the pin 170 moves out from between the leaves, which then make contact and complete the circuit to the magnet. Thus the magnet is energized only when and while the lift cam is in motion, but throughout one cycle of movement of that cam, the magnet continues to be energized, thus ensuring that the record will not be dropped in transit.

Any available source of uni-directional current may be used, or even alternating current if the magnet is strong enough. If the current is taken from the plate circuit of the amplifying system, however, an objectionable click may be produced when the magnet circuit is opened and closed by passage of the pin between the leaves 171, 172. A supplementary switch may be employed to disconnect the amplifier when the magnet circuit is closed, to remedy this.

As a detail of convenience, an enlarged view of the brush connection 168a is shown in Figure 24a. The main lead 168 is shown, as an insulated wire coming through the column 79 into the dog-leg 78, where it is connected to brush 173 which rides on commutator ring 174. This ring is mounted on but insulated from the magnet rod 76a, which, in this embodiment of the invention, is a tubular member. An aperture is made in the wall of this tube, through which aperture insulated pin 175 passes to establish electrical connection between the commutator ring 174 and the rod conductor 169 which extends through the tubular magnet rod 76a but is insulated therefrom. This conductor, of course, is connected to the coils 72a—72a of the electromagnet, these latter being grounded through the magnet casing on the tubular part of the magnet rod and its supporting structure, thus completing the circuit back to the machinery base.

It will be realized that the mechanism described and illustrated represents only a preferred embodiment and one alternative variant of the invention involved. Numerous other variants and modifications which none the less do not depart from the invention will come to mind.

It is also apparent that the invention does not require the construction of a completely new apparatus to utilize it properly. Indeed, one of the advantages of the invention is the ease with which existing apparatus may be modified to include some or all of its features. On the other hand, the mechanism is so compact that it may be fabricated as a complete replacement unit, well suited to installation in existing cabinets.

We claim:

1. In an automatic record player having means including a spindle for retaining and rotating a record having a central opening therein in playing position thereon, apparatus for moving a record comprising a separate magnetically-attractive element having an opening for said spindle therein, removably positioned between the record-retaining means and the face of the record which is nearer thereto; a magnet; means for moving said magnet into registry with the center portion of the other face of said record, means for removing the magnet, the record and the element as a unit from said spindle, for inverting said unit, for returning it to said spindle and for withdrawing the magnet transversely of the spindle axis, leaving the record in playing position with the element adjacent to the face of the record which is farther from the record-retaining means, and means for placing another record in playing position on the spindle with the element adjacent to the face of said other record which is nearer the record-retaining means.

2. The apparatus of claim 1, further having a rotatable shaft coupled to the magnet, and an actuating connection therefore operative upon pivotal movement of the magnet moving means through a predetermined portion of such movement.

3. The construction of claim 1, in which the magnet comprises a pair of magnetic components, said components being separated from each other by a distance sufficient to accommodate said spindle between them.

4. The construction of claim 1, further including an axially displaceable column forming a part of said magnet moving mechanism, said column being displaceable in a direction generally parallel to said spindle.

5. The construction of claim 4, further including a fixed bearing accommodating axial displacement of said column.

6. The apparatus of claim 1, wherein the magnet has an inwardly-extending slot of sufficient width to pass said spindle to a position near the center of the magnet.

7. The apparatus of claim 6, wherein said magnet moving means is provided with mechanism for moving said magnet in at least two planes.

8. The construction of claim 1, including means providing for rotation of said magnet moving means, and a positioning element associated with the magnet moving means and adapted to retain the magnet in either of two predetermined positions as against unintended rotation thereof.

9. In an automatic record player having a turntable and spindle, a tone arm and a trip device operated thereby, feeding mechanism for transferring serially a number of records into playing position, and a cycling cam conditioned for actuation by the trip device, the combination of a record-inverting element, mountings positioning said element normally clear of the aforesaid mechanisms, linkage for moving the record-inverting element into and out of registry with said turntable and spindle, and disabling means incorporating a pair of mutilated gears in fixed relative positions, each having teeth throughout a portion of its periphery, the toothed portion of one being substantially coextensive with the mutilated portion of the other, one of said gears being adapted to actuate the linkage and the other to actuate the feeding mechanism, said disabling means being driven from said cycling cam and being effective to disable actuation of the feeding mechanism during operation of the linkage in one cycle of said cycling cam and to disable operation of the linkage during actuation of the feeding mechanism in the succeeding cycle of said cycling cam, said disabling means being mounted on a shiftable support, and having a position of adjustment in which the disabling means is operative to disable only the linkage and record-inverting element, whereby to ensure actuation of the feeding mechanism upon each cycle of the cycling cam.

10. In an automatic record player having a turntable and spindle, mechanism for turning over a record, which mechanism includes a disc of magnetizable material having a central aperture of a diameter to register with said spindle and a magnet having an inwardly-extending slot of sufficient width to pass said spindle to a position near the center of the magnet, a movable support for the magnet and drive means connected thereto to impart movement toward the turntable parallel to the spindle axis followed by translational movement normal to the spindle axis, said mechanism further including means providing for rotation of said magnet support, and a positioning element associated with the magnet support and adapted to retain the magnet in either of two predetermined positions as against unintended rotation thereof, said means for providing rotation of the magnet support comprising a rack and pinion connection, one component of which is in fixed relation to the means imparting movement in a direction parallel to the spindle axis and moves therewith, and the other component is mounted on a stationary part of the mechanism.

11. In an automatic record player having a driven turntable and a spindle, mechanism for removing a record from playing position, inverting it and restoring it to playing position, said mechanism including a rotatable record-gripping element, a turn drum and connections therebetween; record feeding mechanism including record support structure, a drop cam, and connections therebetween; and a selective drive assembly having a drive shaft driven in timed relation to the turntable drive, said assembly comprising a transmission gear fixed on the drive shaft and a drop cam gear and a turn drum gear running free thereon; a lay shaft having fixed thereon a mutilated gear blind throughout half of its periphery and adapted, on its toothed side, to engage the drop cam gear; a mutilated gear fixed on the lay shaft and blind throughout the opposite half of its periphery, and adapted on its toothed side to engage the turn drum gear, and a driven gear fixed upon the lay shaft and adapted to mesh throughout its periphery with the transmission gear.

12. The mechanism of claim 11 having, in addition, a double-thickness whole gear fixed upon the lay shaft and spaced from the adjacent mutilated gear by a distance at least equal to the thickness of the remote mutilated gear, said double-thickness gear being adapted to mesh throughout its periphery with both the transmission gear and an adjacent gear on the drive shaft.

13. Mechanism according to claim 12 further including a shifter fork mounted to transmit axial movement to the lay shaft and its associated gears and having at least two positions of adjustment, in one of which the mutilated gears are in position to operate the turn drum gear and the drop cam gear in alternation and in the other of which the double-thickness gear is in position to operate the drop cam drum only.

14. In an automatic record player having a turntable and spindle and a machinery base supporting the same, mechanism for removing a record from playing position above the turntable, inverting the record, and restoring it to playing position, said mechanism including an axially shiftable column, a bearing unit on the machinery base mounting said column, a rod-like arm rigidly mounted at right angles to said column and rotatably supported thereby, a record-engaging element affixed to one end of said arm, gearing affixed to the opposite end of said arm, a gear element fixedly mounted on a portion of said machinery base in a position to engage said gearing, crank means associated with said column and connected to impart oscillatory movement thereto, and lever means for axially shifting said column with consequent movement of said gearing into a position in which it does not engage the said gear element.

15. The construction of claim 14, including leverage below the machinery base transmitting movement to said column and means actuated from the turntable and spindle for imparting movement to said leverage.

16. In an automatic record player having a cycling cam keyed to a supporting shaft; a drop drum carried free upon said shaft, a transmission gear pinned to said shaft, and a turn drum carried free upon said shaft; a gear ring on said drop drum, and a gear ring on said turn drum; a gear cluster mounted upon an axis parallel to said shaft and formed to operate as a unit, one gear of said cluster being continuous and positioned to engage said transmission gear, another gear of said cluster being mutilated and having teeth upon but half of its circumference which teeth are positioned to engage said drop drum gear ring, the other gear of said cluster being mutilated and having teeth upon but half of its circumference which teeth are positioned to engage said turn drum gear ring, the mutilated portion of one of said mutilated gears being diametrically opposite to the mutilated portion of the other of said mutilated gears, and the diameter of the gears of said cluster being double the diameter of the said gear rings and transmission gear, respectively.

17. In mechanism for removing and replacing relatively thin articles impaled upon a spindle, the combination of a continuous plate of magnetic material having a centrally disposed aperture, a magnet configured to encompass the spindle but having an access opening extending from the peripheral portion of the magnet to the central area thereof, an arm supporting said magnet, and means for imparting vertical and horizontal movements to the supporting arm.

18. Apparatus according to claim 17 for handling non-magnetic phonograph records, wherein the magnet is a permanent magnet, and the continuous plate of magnetic material is spaced from the magnet when in use by the thickness of the phonograph record.

References Cited in the file of this patent

UNITED STATES PATENTS

| | | |
|---|---|---|
| 1,266,767 | Brosius | May 21, 1918 |
| 1,855,125 | Broeckmeyer | Apr. 19, 1932 |
| 1,967,599 | Thompsett et al. | July 24, 1934 |
| 2,043,789 | Ansley | June 9, 1936 |
| 2,188,769 | Downs | Jan. 30, 1940 |
| 2,263,619 | Downs | Nov. 25, 1941 |
| 2,265,048 | Tsuchiya | Dec. 2, 1941 |
| 2,279,851 | Waln et al. | Apr. 14, 1942 |
| 2,295,092 | Offen | Sept. 8, 1942 |
| 2,297,014 | Offen | Sept. 29, 1942 |
| 2,352,560 | Offen | June 27, 1944 |
| 2,352,563 | Offen | June 27, 1944 |
| 2,368,086 | Becwar | Jan. 30, 1945 |
| 2,506,925 | Johnson | May 9, 1950 |

FOREIGN PATENTS

| | | |
|---|---|---|
| 333,617 | Great Britain | Aug. 18, 1930 |
| 472,135 | Great Britain | Sept. 17, 1937 |